United States Patent
Bender et al.

(10) Patent No.: US 7,068,707 B2
(45) Date of Patent: Jun. 27, 2006

(54) METHOD AND APPARATUS FOR TRACKING SIGNALS IN A WIRELESS COMMUNICATION SYSTEM

(75) Inventors: Paul E. Bender, San Diego, CA (US); Peter J. Black, San Diego, CA (US); Juan Montojo, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 641 days.

(21) Appl. No.: 09/803,234

(22) Filed: Mar. 8, 2001

(65) Prior Publication Data

US 2002/0126744 A1    Sep. 12, 2002

(51) Int. Cl.
*H04K 1/00*    (2006.01)

(52) U.S. Cl. .................. 375/148; 375/350; 375/347

(58) Field of Classification Search ............... 375/130, 375/147, 148, 144, 347, 350; 455/132
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,930,288 A | 7/1999 | Eberhardt ................... | 375/200 |
| 6,097,972 A | 8/2000 | Saints et al. ................ | 455/572 |
| 6,130,923 A * | 10/2000 | Levin et al. ................ | 375/347 |

FOREIGN PATENT DOCUMENTS

| | | |
|---|---|---|
| EP | 1069703 | 1/2001 |
| WO | 00334870 | 6/2000 |

OTHER PUBLICATIONS

R. Price, et al.: "A Communictaion Technique for Mulitpath Channels," Proceedings of the IRE, Mar. 1958. (pp. 555-570).

* cited by examiner

*Primary Examiner*—Temesghen Ghebretinsae
(74) *Attorney, Agent, or Firm*—Philip Wadsworth; Sandra L. Godsey

(57) ABSTRACT

A method and apparatus for tracking signals in a wireless communication system. In one embodiment, a base station includes a rake antenna having multiple fingers. When any of the fingers goes out of lock, the base station waits a predetermined time period and then adjusts the lock detect filter. The adjustment is based on comparison of received signal energy to an adjusted energy threshold. The comparison may result in an increased energy level of the filter. In one embodiment, if a mobile station is in soft hand-off, the base station ignores the lock state of the fingers and transmits power control information based on the received signal energy. If the mobile station is not in soft hand-off a predetermined power control pattern is applied for gradual power adjustment.

29 Claims, 8 Drawing Sheets

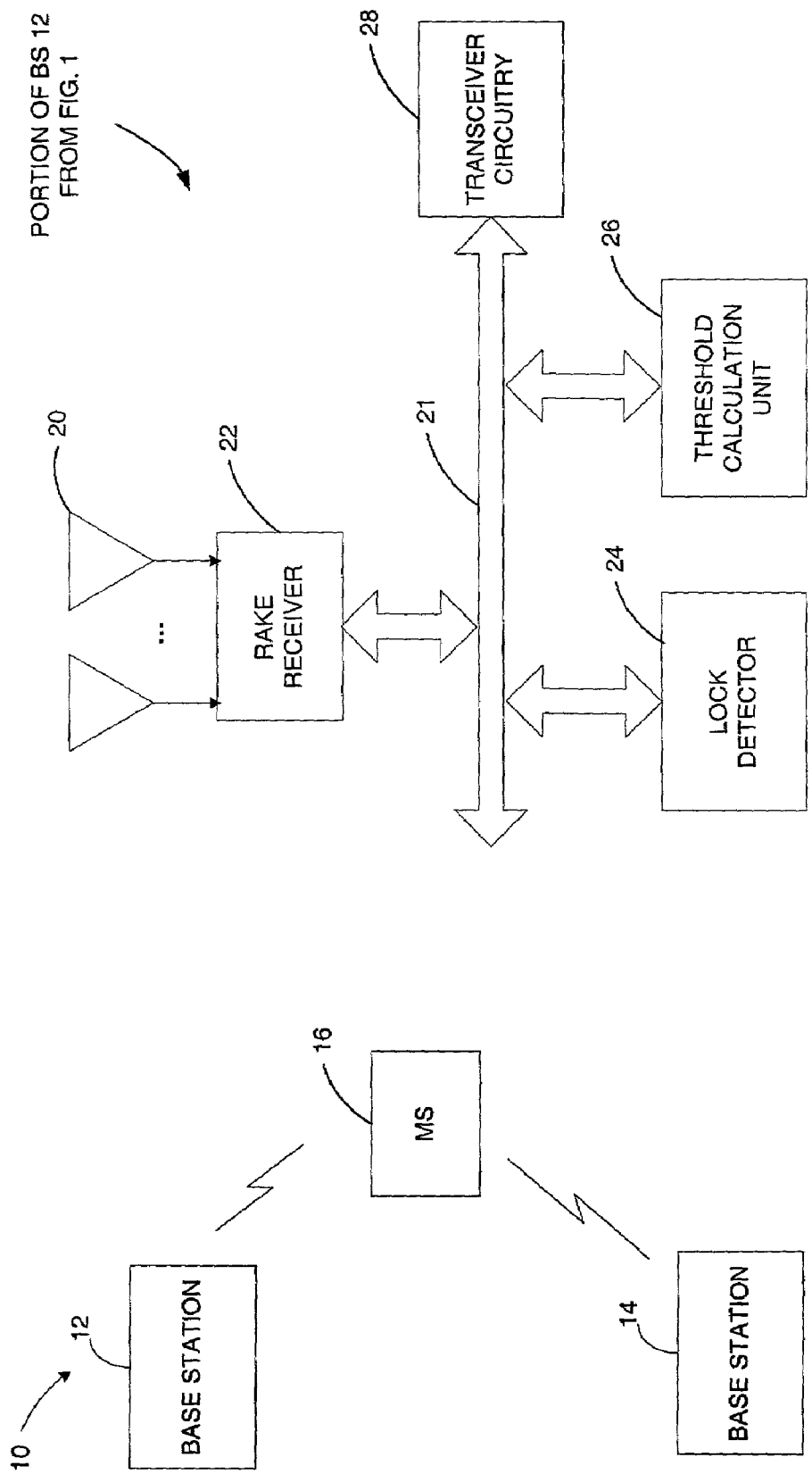

METHOD AND APPARATUS FOR TRACKING SIGNALS IN A WIRELESS COMMUNICATION SYSTEM

REFERENCE TO CO-PENDING APPLICATIONS

The present invention is related to U.S. patent application Ser. No. 09/624,319, filed Jul. 24, 2000, entitled "METHOD AND APPARATUS FOR PROCESSING A MODULATED SIGNAL USING AN EQUALIZER AND A RAKE RECEIVER," assigned to the assignee hereof and hereby expressly incorporated by reference.

FIELD

The present invention relates to communications. More particularly, the present invention relates to a novel and improved method and apparatus for tracking signals in a wireless communication system.

BACKGROUND

In a wireless communication system, communications between a base station and mobile users are affected by the motion of the mobile user(s) as well as the environment of the geographical coverage area. The communication link from the base station to the mobile user(s) is referred to as the Forward Link. The communication link from the mobile user(s) to the base station is referred to as the Reverse Link. The base station tracks the mobile user(s) by signals received via the Reverse Link. Degradation of the Reverse Link impacts the ability of the base station to track and communicate with mobile user(s). Degradation may be caused by shadowing, interfrequency searching, fading, blocking, monitoring, such as monitoring other systems, and other effects. When the base station loses the Reverse Link, the base station is no longer able to track the mobile user(s). Once a link is lost, recovery becomes difficult.

There is a need, therefore, for a method and apparatus for the base station to detect an anticipated loss of the Reverse Link prior to actual loss. Additionally, there is a need for a method and apparatus for a base station to adjust receiver operation upon identification of a problem.

SUMMARY

The disclosed embodiments provide a novel and improved method for tracking signals in a wireless communication system. According to one aspect, in a wireless communication system having a rake receiver with multiple fingers, a method includes assigning a unique path to each of the multiple fingers, determining whether all fingers are in a lock state, maintaining path assignments of the multiple fingers, comparing energy of a received signal to a threshold, adjusting a lock filter in response to the comparison.

In another aspect, a transceiver includes a rake antenna having a plurality of fingers, wherein the plurality of fingers are adapted to receive multipath signals, and a lock detector coupled to the rake antenna and operative to filter a received signal and operative to adjust the filtering based on a lock state of the fingers.

In still another aspect, a method for tracking a mobile station in a wireless communication system includes determining if the mobile station is in soft hand-off, and ignoring a lock state of a finger if the mobile station is in soft hand-off, or transmitting a predetermined power control pattern if the mobile station is not in soft hand-off.

BRIEF DESCRIPTION OF THE DRAWINGS

FIG. 1 illustrates in block diagram form a wireless communication system.

FIGS. 2–3 illustrate in block diagram form portions of a base station as in FIG. 1.

DETAILED DESCRIPTION OF THE PREFERRED EMBODIMENTS

Figure 3:
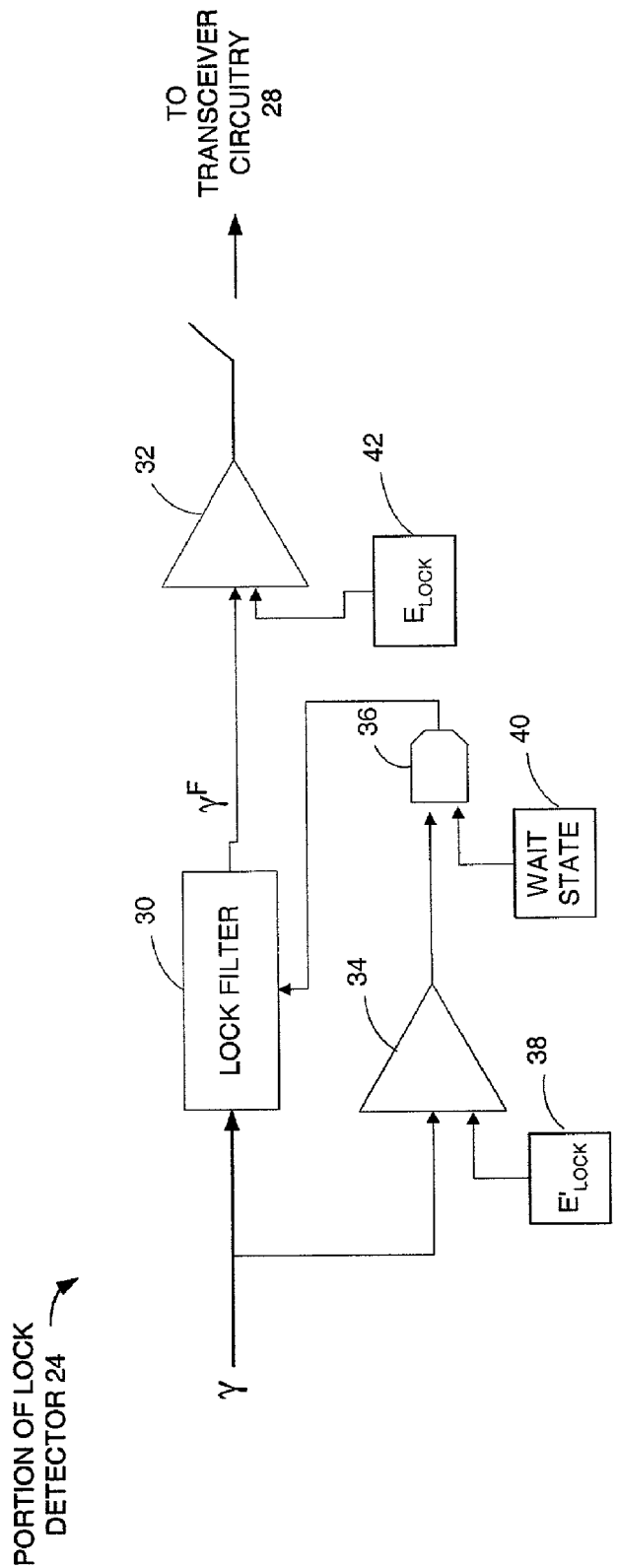

FIG. 1 illustrates a wireless communication system 10 having base stations 12, 14 and mobile station 16. The mobile station 16 moves within the geographical environment of the system 10. The radio air interface provides the medium for the Forward Link(s) and the Reverse Link(s). In a spread spectrum transmission system, such as Code Division Multiple Access (CDMA) systems, including those detailed in standards including the "TIA/EIA/IS-95 Mobile Station-Base Station Compatibility Standard for Dual-Mode Wideband Spread Spectrum Cellular System," hereinafter referred to as "the IS-95 standard," the "TIA/EIA/IS-2000 Standards for cdma2000 Spread Spectrum Systems," hereinafter referred to as "the cdma2000 standard," and/or the "TIA/EIA/IS-856 cdma2000 High Rate Packet Data Air Interface Specification," hereinafter referred to as "the HDR standard," spread spectrum signals occupy a same channel bandwidth, wherein each signal has its own distinct Pseudorandom Noise (PN) sequence. Operation of a CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS," and also in U.S. Pat. No. 5,103,459, entitled "SYSTEM AND METHOD FOR GENERATING WAVEFORMS IN A CDMA CELLULAR TELEPHONE SYSTEM," both assigned to the assignee of the present Application for Patent and hereby expressly incorporated by reference. In a spread spectrum system, multiple users transmit messages simultaneously over a same channel bandwidth. Each base station 12, 14 includes a rake type receiver for distinguishing multiple received signals.

In a CDMA system, resources are allocated to all simultaneous users, wherein the transmission power is controlled to a minimum required to maintain a given Signal-to-Noise Ratio, SNR. The SNR is typically determined by a desired or required performance level. Signals from other users become interference during demodulation of a given encoded signal. Additionally, as signals are transmitted within a geographical environment, the terrain and objects cause the transmitted signals to be reflected and refracted, resulting in replicated signals, or multipaths, that are received at a receiver. Multipaths are made up of a group of reflections from objects, wherein no one of the multipaths is dominant. The different reflected signal paths arrive at the receiver at different times, and may have different amplitudes and phases.

The structures of the individual propagation paths can be identified and potentially exploited when they are distinguished from each other. In a spread spectrum system using pseudorandom sequences, such as Pseudorandom Noise, PN, codes, the time duration, $T_c$, of an individual bit or chip of the spread signal is inversely proportional to the spreading bandwidth. Note that $T_c$ is referred to as the chip duration. The individual propagation paths may be distinguished if mutually separated by delays greater than $T_c$. The amplitudes of signals of a given path are dependent on relative propagation distances, as well as the reflective and/or refractive properties of the terrain, buildings, and other elements of the environment, etc. In some cases, distinguishable multipath components will actually be linear combinations of indistinguishable paths of varying amplitudes, wherein the amplitude appears to be Rayleigh-distributed with uniformly distributed phase. By identification of multipath components, the energy of each may be obtained and used for demodulation of the received signal.

Figure 8:
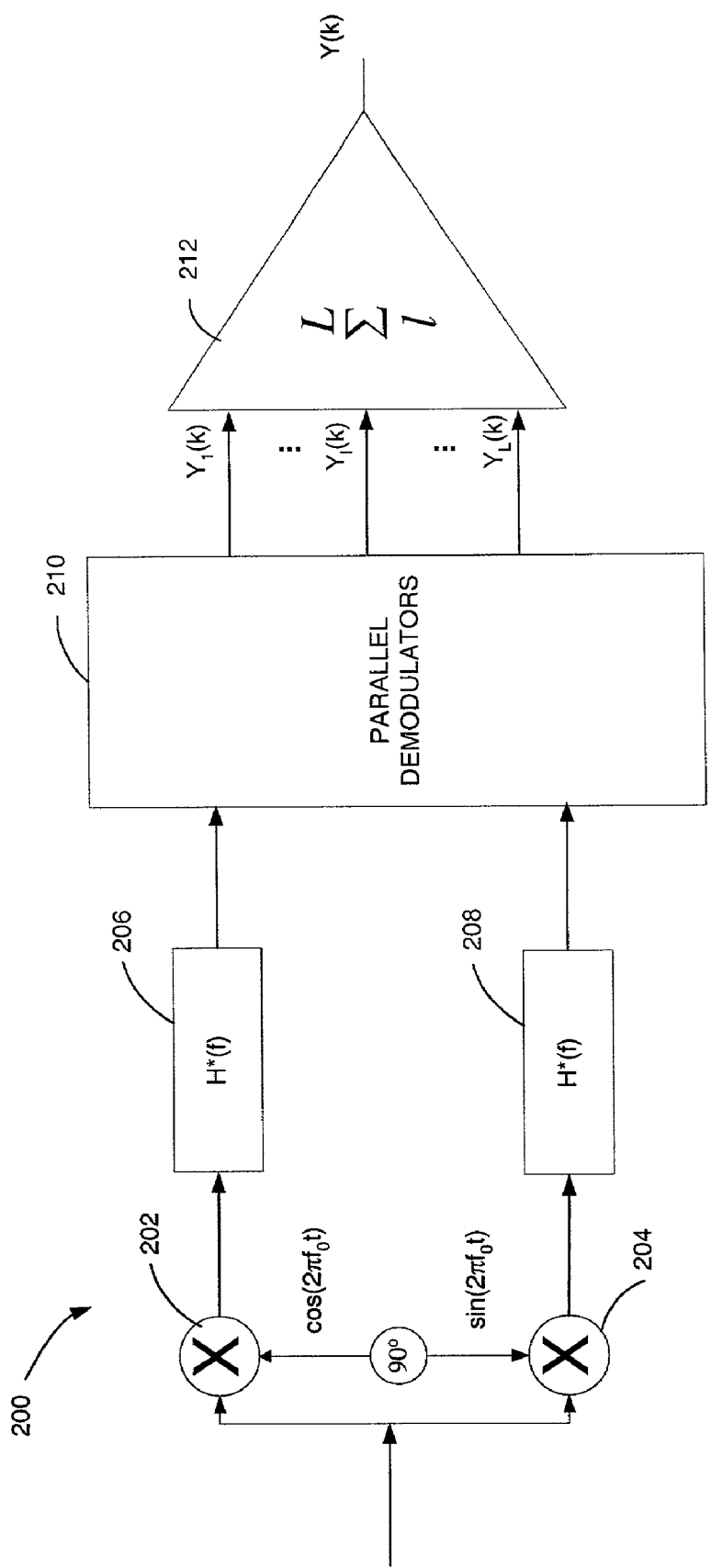
FIG. 8 illustrates a rake type receiver in a wireless communication system.

It is possible to use a rake type receiver structure to exploit the diversity of a spread spectrum system. A rake receiver is detailed by R. Price and P. E. Green, Jr. (1958) in "A Communication Technique for Multipath Channels," Proceeding of the IRE, vol. 46, pp. 555–570, which is hereby expressly incorporated by reference. A rake type receiver typically includes a searcher element and a number of finger processors. FIG. 8 illustrates a rake receiver 200, wherein the received signal is provided to multipliers 202 and 204. The received signal is processed with carrier components I and Q in multipliers 202, 204, respectively, and the results are provided to waveform matched filters 206, 208, respectively. The outputs of the waveform matched filters 206, 208 are provided to parallel demodulators 210. The parallel demodulators 210 are optimized for multipath propagation paths. Each of the multipath component demodulators is referred to as a "finger" of the rake receiver 200. The parallel demodulators 210 form weighted, phase-adjusted, and delay-adjusted components. The parallel demodulators 210 are made up of L fingers. The fingers are assigned to process the strongest multipaths to generate demodulated symbols for those multipaths. The rake receiver 200 then combines the demodulated symbols from all assigned finger processors to generate recovered symbols that are estimates of the transmitted data at summation node 212. The rake receiver 200 efficiently combines energy received via multiple signal paths. The rake receiver 200 may be used in a receiver or a transceiver, such as a base station, mobile station, access terminal, access network, remote station, etc. The rake receiver 200 may be implemented with one antenna element or multiple antenna elements, such as an antenna array.

Returning to FIG. 1, system 10 may employ rake receivers, such as receiver 200 of FIG. 8, in base stations 12, 14, or mobile station 16. FIG. 2 illustrates a receiver portion of base station 12 having a rake receiver according to one embodiment. Antenna array 20 receives signals on the Reverse Link, and transmits signals on the Forward Link. The antenna array 20 includes multiple fingers for receiving multiple signals simultaneously. The antenna array 20 receives multipath signals generated by mobile stations 16 within system 10. The antenna array 20 is coupled to the transceiver circuitry 28 via a rake receiver 22 and a communication bus 21. The rake receiver 22 may be similar to the rake receiver 200 of FIG. 8, or may have an alternate configuration. The rake receiver 22 is operative to process multipaths in a spread spectrum wireless communication system. The rake receiver 22 allows base station 12 to take advantage of the multipaths of transmitted signals of a given channel. The rake receiver 22 demodulates and uses the signal energy of all paths. The rake receiver 22 processes the received signals and provides the information to a communication bus 21.

The transceiver circuitry 28 includes a processor for processing signals from the various fingers of the antenna array 20. The transceiver circuitry 28 communicates with a lock detector 24 and a threshold calculation unit 26. For each finger of antenna array 20, the lock detector 24 compares the received signal to an energy threshold. When the received signal is above the energy threshold, the lock detector determines that the receiving path is good for reception and therefore "locks" onto the current path of the signal. When a received signal is below the energy threshold, the lock detector 24 determines that the current path is not good for reception of the signal and, therefore, the corresponding finger of the antenna may be adjusted to receive signals of a different path. Adjustment(s) involving filter coefficient(s) or alternate filter configuration(s) may be done in the lock detector 24, discussed hereinbelow.

The transceiver circuitry 28 is also coupled to the threshold calculation unit 26. The threshold calculation unit 26 adjusts the threshold used for comparison by the lock detector 24 in response to changes in the energy level of the received signal. In one scenario, an increased noise level results in a higher threshold level requirement. Threshold calculation unit 26 generates multiple energy thresholds depending on the target operation of the system 10 and the requirements of transmission.

In FIG. 2, the rake receiver 22, the lock detector 24, and the threshold calculation unit 26 are illustrated as separate functional blocks for clarity of understanding. Alternate embodiments may combine the functionality of these blocks in an alternate manner, for example, as within the rake receiver 22. Functionally, the rake receiver 22, the lock detector 24, and the threshold calculation unit 26 lock onto the different multipath components. When a time reference is used, the different multipath components are separately identified as distinct echoes of the signal separated in time for a given antenna. The separately identified components are then unified in phase and combined to yield a final composite received signal.

For each finger of the rake receiver 22, the lock detector 24 tracks the received signal generating a long-time average filtered signal. The average is compared to a lock threshold energy level. The comparison results in a reception decision, wherein good reception indicates the finger has locked onto a good propagation path. The lock detector 24 also provides a fast recovery when the average filtered signal falls below the threshold energy level. In this case, the lock detector 24 compares the pre-filtered received signal to an adjusted threshold energy level. The adjusted threshold may be greater than the lock threshold energy level providing a conservative recovery criteria, wherein a higher energy level is required to recover the finger. Conversely, the adjusted threshold may be less than the lock threshold energy level providing a more liberal recovery criteria, wherein a lesser energy level seeks to recover the finger if at all possible.

For recovery, or fast recovery, the received signal energy is compared to an adjusted threshold energy level, wherein if the received signal energy is greater than or equal to the adjusted threshold, an adjustment is made to signal filtering. The adjustment results in a different calculation of the long-time average filtered signal.

FIG. 3 illustrates one embodiment of a portion of the lock detector 24 for processing signals from one finger of rake receiver 22. Signals are received from antenna array 20 of FIG. 2, processed by rake receiver 22, and provided to a lock filter 30. The signal received at the lock detector 24 from antenna array 20 is labeled γ. The lock filter 30 performs a long-time filtering, and outputs an average filtered version of the signal labeled $\gamma^F$. The lock filter 30 corrects for channel-induced distortions. The lock filter 30 may be an equalizing filter, such as an Infinite Impulse Response, IIR, filter. In one embodiment, an equalizing filter includes a plurality of taps, wherein the outputs of the taps are amplified and summed. The output of the lock filter 30 is an average long-time filtered version of the received signal. The filtered signal $\gamma^F$ is provided as an input to comparator 32. Comparator 32 compares the filtered signal $\gamma^F$ to the lock threshold energy level, $E_{LOCK}$, supplied by a threshold generator 42. The threshold generator 42 may be preprogrammed to a fixed or predetermined threshold level, or may be dynamically changed based on operation of the base station 12, or some other criteria. In one embodiment, the threshold generator 42 is responsive to threshold calculation unit 26 that performs the calculations and determines an appropriate threshold level. When the energy of the filtered signal $\gamma^F$ exceeds the threshold level $E_{LOCK}$ the path of the associated finger is locked.

The output of comparator 32 is a LOCK signal indicating the result(s) of the comparison. The LOCK signal provides the lock status of a finger. In one embodiment, the LOCK signal is a binary indicator, wherein assertion indicates a lock condition, and negation indicates the finger has not locked onto a path or path component. Alternate embodiments may use a different polarity assignment. Similarly, the LOCK signal may include multiple bits that provide more detailed information regarding the lock condition. For example, one LOCK signal indicates the commitment of the lock condition, wherein the LOCK signal provides an indication of when the finger is trending toward an unlocked situation. As illustrated, the LOCK signal is coupled to the transceiver circuitry 28 via a switch. The lock detector 24 performs the comparison of energy levels for each finger of rake receiver 22.

While a given path of a finger remains in lock, signals received via that path continue to be processed by the transceiver circuitry 28. The lock condition corresponds to good reception on that path. However, when the finger goes out of lock, i.e., $\gamma^F$ is below $E_{LOCK}$, reception has degraded and it may be necessary to reassign the finger to another path or provide for recovery of the finger by adjustment or reconfiguration of the lock filter 30. For a finger out of lock, one embodiment provides a first time period to allow the finger to autonomously recover, followed by additional time to adjust the filter components and/or configuration. This additional time provides a last chance to recover the current path on a given finger. On expiration of the additional time, the finger may be reassigned to a new path. In one embodiment, reassignment is made to another radio frequency.

Specifically, when a given finger stays out of lock for a predetermined time period, T1, the lock detector 24 attempts to adjust the lock filter 30. In this situation, an adjusted energy level threshold $E'_{LOCK}$ is used for comparison to the pre-filtered received signal γ. The result of the comparison provides feedback for adjustment of the lock filter 30. Note that one adjustment may be to ignore the filtering effects of lock filter 30, wherein the input to the lock filter 30 is provided as its output also. In this case, the transfer function describing the lock filter 30 is given as an impulse, i.e. h(t)=δ(t). An alternate adjustment may be to increase the energy level of the lock filter 30, thus increasing the energy of received signals sufficient to provide a LOCK signal. According to one embodiment, adjustment of the lock filter 30 gives a weight to each of the filter samples, wherein greater weights are given to more recent samples of the received signal γ. In this way, the lock filter 30 seeks to more accurately track the received signal γ.

For the lock filter 30 adjustment, received signals γ are provided as an input to comparator 34. The signal γ received by the fingers is thus compared to an adjusted energy threshold $E'_{LOCK}$ in comparator 34. The adjusted energy threshold $E'_{LOCK}$ is generated by the generator 38. In one embodiment, the adjusted energy threshold $E'_{LOCK}$ is responsive to threshold calculation unit 26. The output of comparator 34 is provided as an input to an AND gate 36. A second input to AND gate 36 is a wait state indicator provided by timer 40. The timer 40 allows the time period T1 for the lock detector 24 to settle onto a path. This takes into consideration the vagaries of a wireless system, such as the geographical and environmental conditions, as well as the movement of a mobile station. When the wait state T1 expires and the received signal is greater than the adjusted threshold level $E'_{LOCK}$, an adjustment is made to the lock filter 30. In one embodiment, a bit is generated by the AND gate 36 indicating either to by-pass the lock filter 30 or to allow filtering based on the polarity of the bit. In an alternate embodiment, multiple bits are provided as a message to adjust the filtering coefficients of the lock filter 30. The adjustment may assign weights to the samples of the lock filter 30 or may reduce the number of samples used to generate an average signal. Note that according to one embodiment, the threshold calculation unit 26 controls the generators 38 and 42.

Figure 4A:
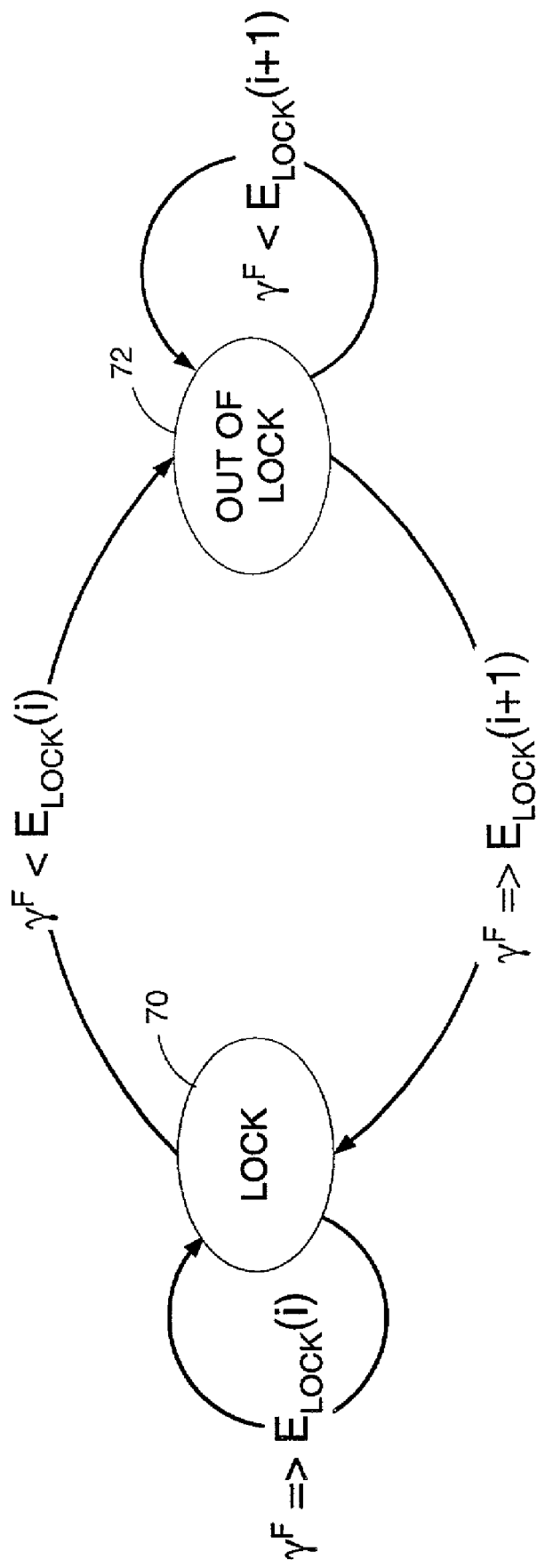
FIG. 4A illustrates in state diagram form operation of a base station.
Figure 4B:
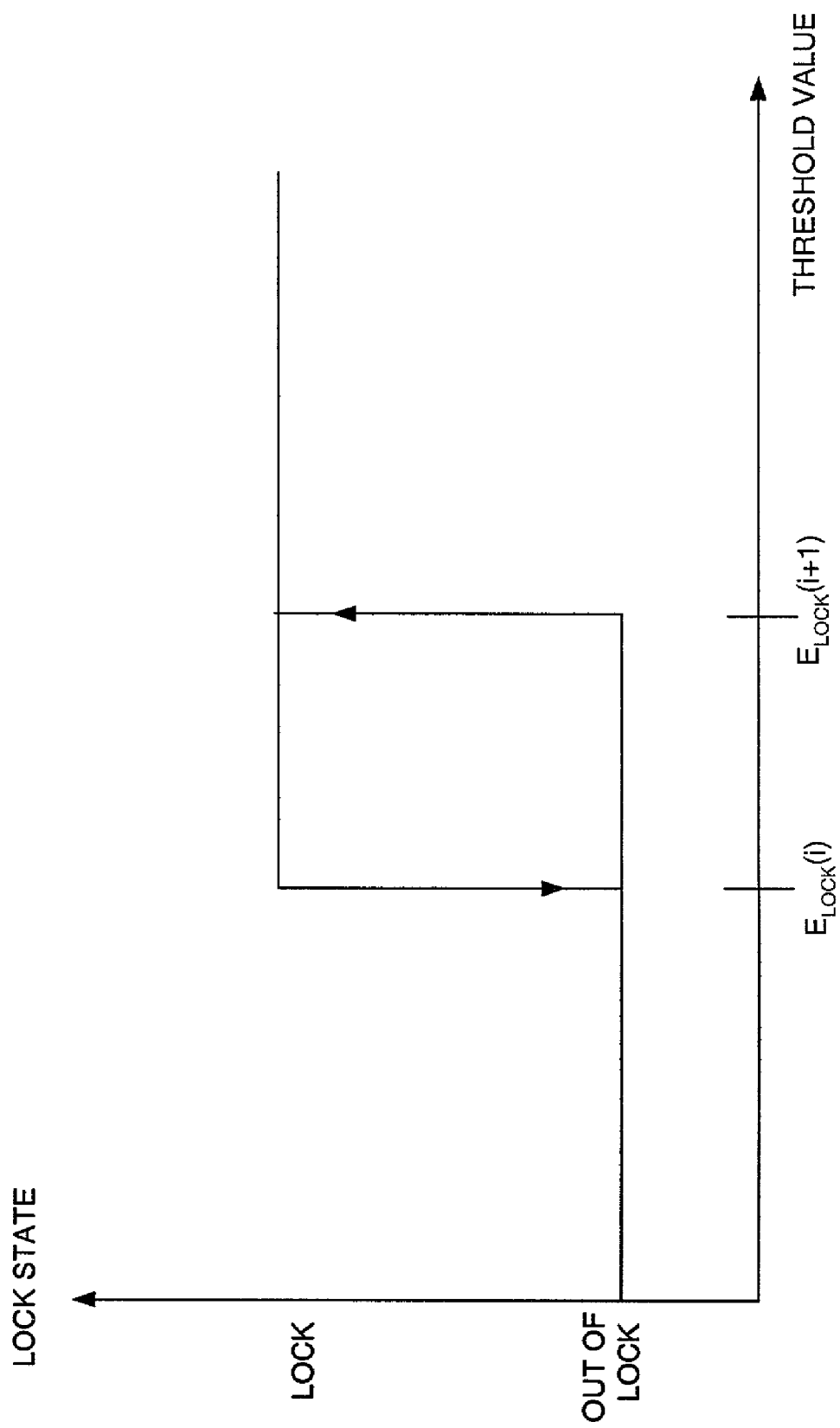
FIG. 4B illustrates in timing diagram form state transitions during operation of a base station.

Operation of each finger of the rake receiver 22 of base station 12 includes two states: LOCK and OUT OF LOCK. FIG. 4A provides a state diagram of operation of the rake receiver 22. FIG. 4B illustrates a plot of operation of rake receiver 22 with respect to the lock states. The LOCK state 70 corresponds to good reception of a path on the finger. The OUT OF LOCK state 72 corresponds to poor reception of a path on the finger. Once the finger acquires the LOCK state 70, the received signal γ is processed and filtered to determine the long-time average $\gamma^F$. Each update of the filtered average $\gamma^F$ is then compared to the threshold $E_{LOCK}$. A transition is made from state 70 to the OUT OF LOCK state 72 when $\gamma^F$ falls below the threshold $E_{LOCK}$. When the finger acquires the state 72, the received signal γ is available for a recovery processing. While in state 72 the filtered average $\gamma^F$ is again compared to the threshold $E_{LOCK}$. When the value of $\gamma^F$ is equal to or exceeds $E_{LOCK}$, operation transitions back to state 70.

In one embodiment the value of $E_{LOCK}$ is adjusted on transition from state 70 to state 72, wherein a first threshold $E_{LOCK}$ (i) is applicable when in state 70, and a second threshold $E_{LOCK}$ (i+1) is applicable when in state 72. In this way, a different energy threshold is used to trigger a transition to the IN LOCK state 70 than the energy threshold used to trigger a transition to the OUT OF LOCK state 70. The hysteresis type characteristic of such a scheme is illustrated in FIG. 4B. The horizontal axis corresponds to threshold values, and the vertical axis corresponds to the state. Starting from an OUT OF LOCK state 72, a transition occurs at threshold $E_{LOCK}$ (i+1) to the IN LOCK state 70. Conversely, from the IN LOCK state 70 a transition to OUT OF LOCK state 72 occurs at a threshold $E_{LOCK}$ (i). In the illustrated embodiment, a higher threshold $E_{LOCK}$ (i+1) is used for transition to the IN LOCK state 70, so as to increase the certainty that the finger is locked onto a path having good reception. A lower threshold $E_{LOCK}$ (i) is used for transition to the OUT OF LOCK state 72, so as to allow for variations in signal strength that do not necessarily correlate to indicate poor reception.

Figure 5:
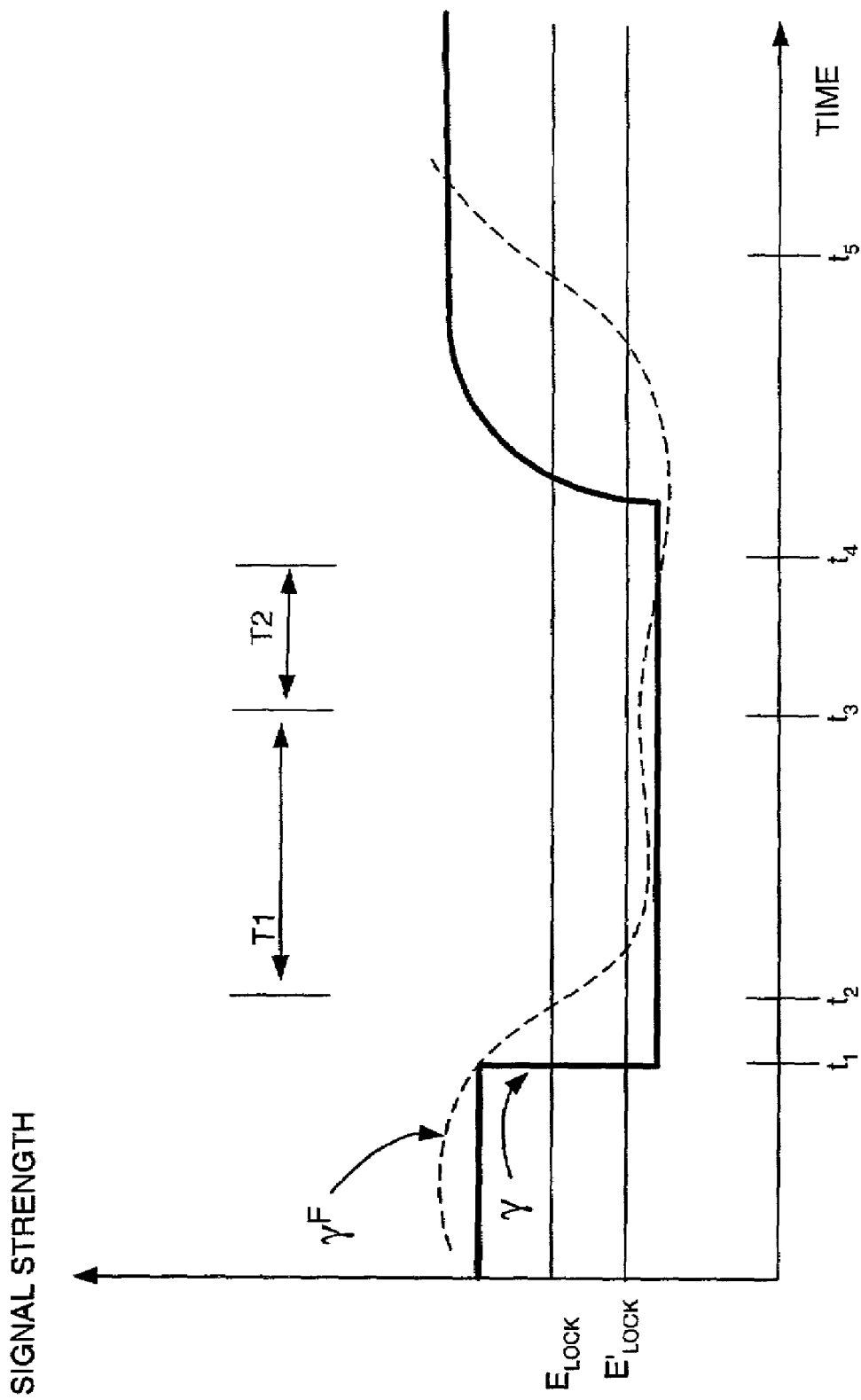
FIG. 5 illustrates in timing diagram form signal tracking in a wireless communication system.

According to one embodiment, expiration of the wait time T1 allows adjustment of the lock filter 30 and initiates a second time period, T2, to allow time to effect recovery of the finger. FIG. 5 illustrates one scenario wherein a received signal γ and the associated filtered average $\gamma^F$ for one finger in rake receiver 22 are plotted as a function of time. Initially, the average $\gamma^F$ is above the threshold $E_{LOCK}$, and therefore, the finger is in lock. At time $t_1$ the signal strength of the received signal γ is reduced below the threshold $E_{LOCK}$. The filtered average $\gamma^F$ falls below $E_{LOCK}$ thereafter at time $t_2$, triggering initiation of the time period T1. During time period T1 no adjustment is made to the lock filter 30, but rather, the finger is given time to recover. Time period T1 allows for short-term variations and perturbations in the received signal for this finger.

Continuing with FIG. 5, at time $t_3$ the time period T1 expires, and time period T2 is initiated. During time period T2 the lock filter 30 may be adjusted to allow fast recovery of the finger. Adjustment of the lock filter 30 results in generation of an adjusted filtered signal (not shown). Time period T2 expires at time $t_4$ while both γ and $\gamma^F$ are below $E_{LOCK}$. In this scenario, the finger did not recover and will be reassigned. In other words, at the expiration of time period T2, effectively the total time period (T1+T2), if the finger has not recovered the finger is reassigned to an alternate path. Whereas if recovery occurs during time period T2 then the finger is in lock. Note that subsequent to time $t_4$ the signals γ and $\gamma^F$ rise above $E_{LOCK}$ and would have allowed the finger to recover if T2 had expired at or around $t_5$. The determination of the actual time duration of time period(s) T1,T2 may be predetermined to fixed values, or may be dynamically adjusted according to historical information and/or heuristic determinations. In alternate embodiments, further signal processing may be used to determine the time period(s) T1, T2, wherein the determination may be a function of a Bit Error Rate (BER), a Frame Error Rate (FER), and/or a data error rate. The energy level of the threshold value(s) $E_{LOCK}$ and $E'_{LOCK}$ are determined to optimize recovery of a finger over a variety of operating conditions and scenarios. For example, in one embodiment determination of threshold energy levels considers how many other fingers are in lock, wherein a more liberal threshold may be applied if no other fingers are in lock. Conversely, if all the other fingers are in lock, the determination may be to apply conservative threshold levels to increase the accuracy of the received signals.

Figure 6:
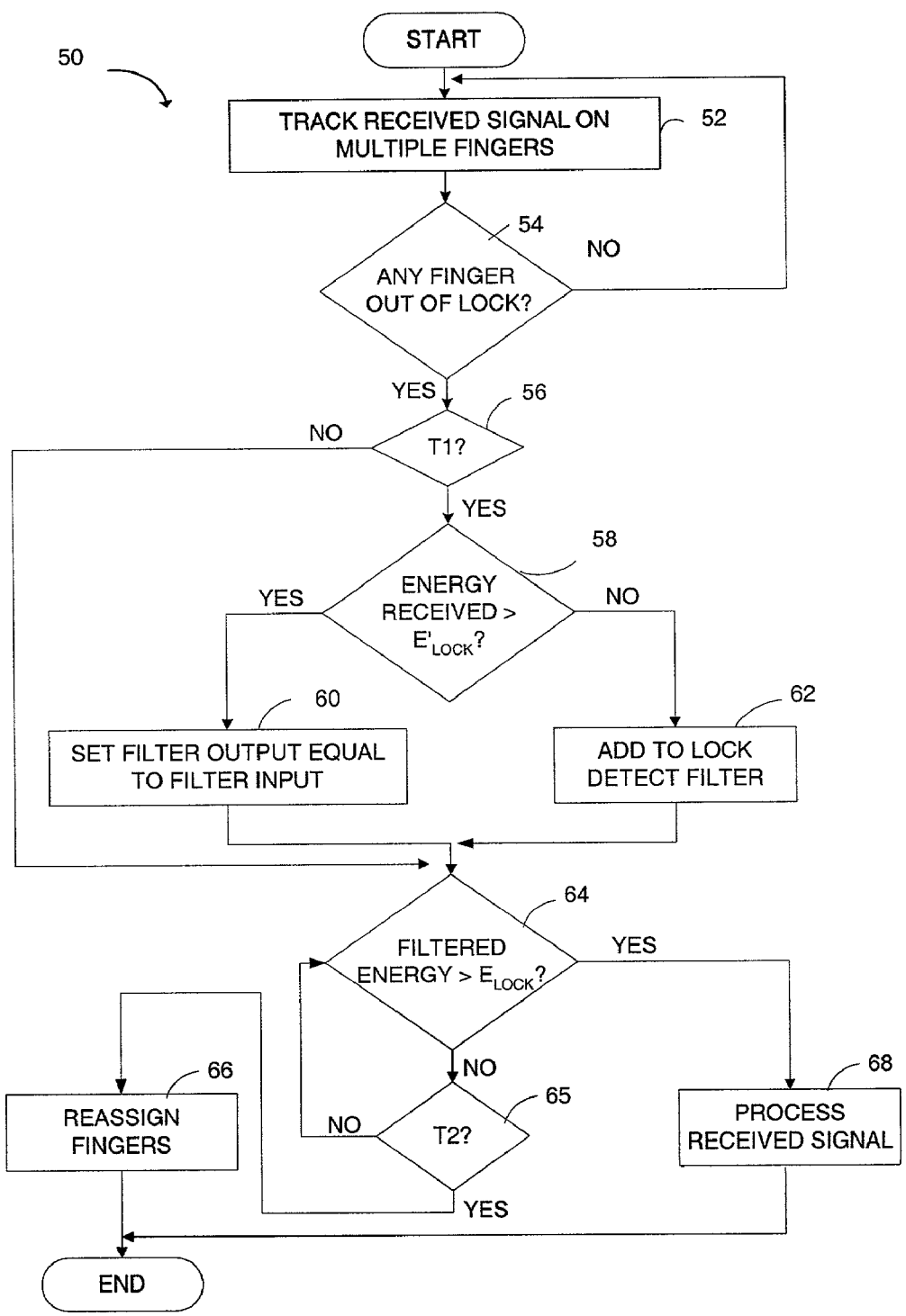
FIGS. 6–7 illustrate in flow diagram form methods of signal tracking in a wireless communication system.

When a finger is out of lock, time is provided to make filter adjustment to allow recovery. When recovery is not achieved, the fingers may be reassigned to alternate paths. FIG. 6 illustrates a method 50, according to one embodiment, for tracking signals in system 10 of FIG. 1. From the start, the timer periods T1, T2 are initialized. The process then begins by tracking received signals on multiple fingers of antenna array 20 at step 52. A check is made at decision diamond 54 to determine if any of the fingers are out of lock. If at least one of the fingers is out of lock, processing continues to decision diamond 56, else processing returns to step 52 to continue tracking signals. At decision diamond 56, if the time period T1 has expired, the received signal is compared to an adjusted threshold $E'_{LOCK}$ at decision diamond 58. If the time period T1 has not expired, the processing continues to decision diamond 64 to compare the filtered signal to a threshold $E_{LOCK}$. In this way, the path assignment of the finger is maintained at least until expiration of time period T1.

When any finger is determined to be out of lock at decision diamond 54, the finger path assignment is first maintained for a predetermined time period, T1 at decision diamond 56. As discussed hereinabove, the time period T1 is a wait period to allow for temporary outages from which the system will autonomously recover. The time period T1 may be a predetermined time period, or may be dynamically adjusted during operation. Additionally, the time period T1 may be based on historical and/or statistical information relating to operation of system 10. If the finger is still out of lock after expiration of the time period T1, processing continues to decision diamond 58. The energy of the received signal is compared to an adjusted energy level $E'_{LOCK}$ at decision diamond 58. The comparison provides information for filtering adjustment, such as for lock filter 30 of FIG. 3. For sufficient energy, i.e. greater than $E'_{LOCK}$, the output of lock filter 30 is set equal to the input to lock filter 30 at step 60. For insufficient energy, i.e., less than or equal to $E'_{LOCK}$, energy is added to the lock filter 30 {step 62}. The adjustment of the energy level for the lock filter 30 results in an adjusted output for comparison with the energy threshold $E_{LOCK}$ in comparator 32 of FIG. 3. After completion of the filtering adjustment, the process compares the filtered signal to the threshold $E_{LOCK}$ at decision diamond 64. At this point, if there is sufficient energy to lock onto the signal, received signal processing continues at step 68. However, if there is still insufficient energy a second time period T2 is provided, wherein if the time period T2 has expired at decision diamond 65 the fingers are reassigned at step 66. Until the time period T2 expires, processing returns to decision diamond 64 where the energy is compared to $E_{LOCK}$.

Figure 7:
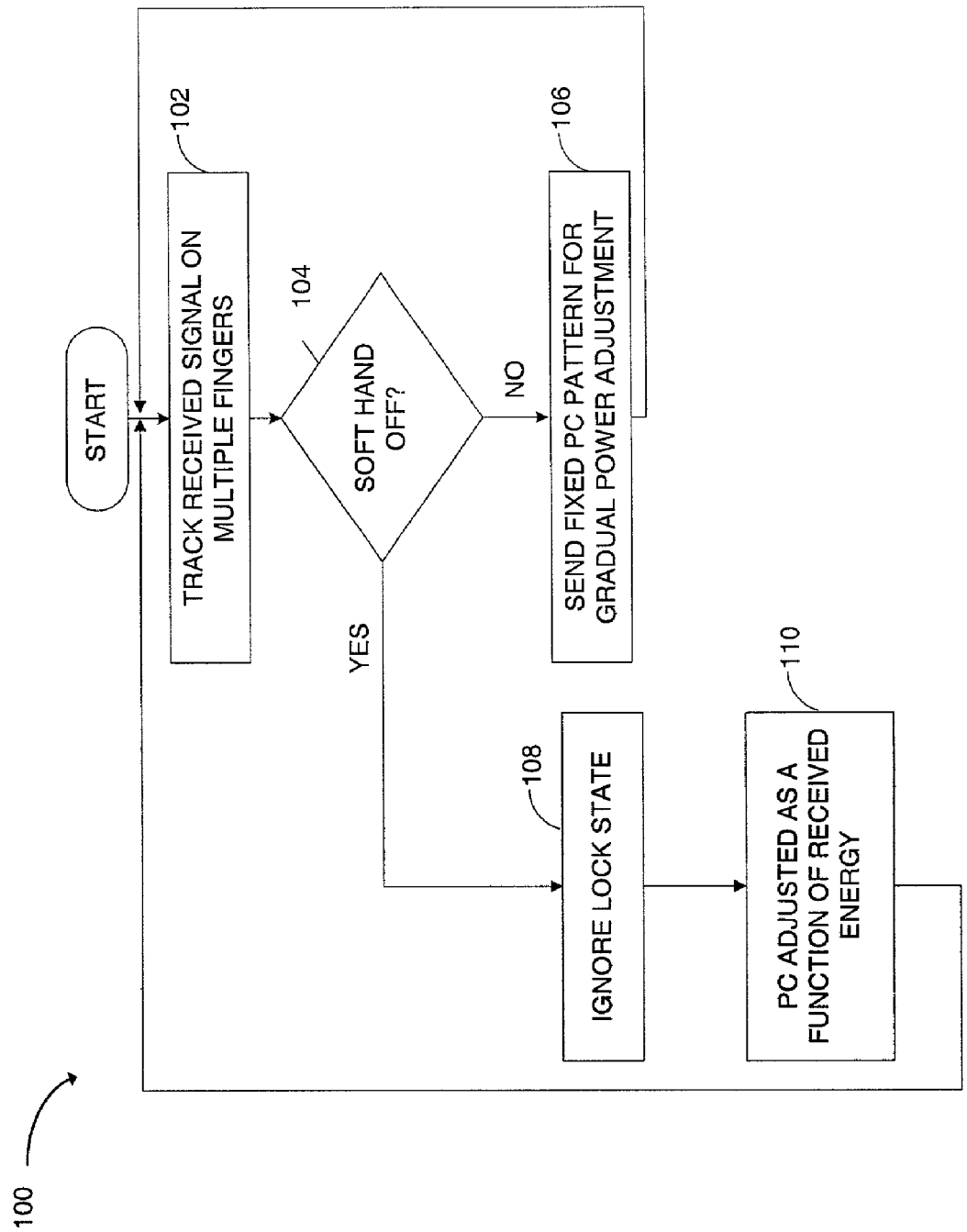

There are scenarios during operation when the base station 12 may desire to ignore the lock state of the fingers and provide power control irrespective of the quality of the received signals. FIG. 7 illustrates one embodiment of a method of 100 tracking signals in a wireless communication system. The process starts when signals are received at multiple fingers at step 102. A check is made to determine if the mobile station is in soft hand-off at decision diamond 104. Soft hand-off refers to the state of the mobile station wherein a mobile station communication is made to at least two base stations. As the mobile station moves from one coverage area to another, each base station communicates with the mobile station. The mobile station may then terminate a transmission with one base station in preference to another base station wherein the latter communication has a higher quality. If the mobile station is in soft hand-off, the base station ignores the lock state at step 108 and makes power control adjustments as a function of the energy of the received signal at step 110. If the mobile station is not in soft hand-off, the base station sends a predetermined pattern to the mobile station at step 106 for Power Control (PC), wherein the pattern instructs the mobile station to gradually adjust the power of the transmitted signal.

When a base station loses the Reverse Link from a mobile station, either temporarily or permanently, the base station may not be able to receive signals from the mobile station and therefore is unable to track the mobile station. Ideally, the base station will detect in impending Reverse Link loss and make the necessary adjustments. The base station may detect such potential problems by comparing the energy of received signals to a threshold energy level. When the base station detects such a problem, a decision is made that the mobile station is suffering a temporary outage. When the temporary outage lasts for an excessive time, it may become permanent. In one embodiment, to minimize the loss of Reverse Link signals at the base station during a temporary outage, the base station disables tracking of assigned fingers. This prevents tracking noise during the temporary outage. The base station then sets a relatively high threshold for finger reassignment, such that reassignment is performed on a high probability of the searcher finding a real path. Note that during such lockout time, the receiver may choose to perform fast recovery of a given finger.

Thus a novel and improved method and apparatus for tracking signals in a wireless communication system has been described. Various examples, embodiments, aspects, and figures have been provided for clarity of understanding and not to exclude alternate embodiments within the spirit and scope of the invention. Those of skill in the art would understand that the data, instructions, commands, information, signals, bits, symbols, and chips that may be referenced throughout the above description may be represented by voltages, currents, electromagnetic waves, magnetic fields or particles, optical fields or particles, or any combination thereof. Similarly, while various embodiments are described with respect to a particular polarity scheme, assertion and negation are relative terms and not strictly limited to high or low logic levels.

Those of skill would further appreciate that the various illustrative logical blocks, modules, circuits, and algorithm steps described in connection with the embodiments disclosed herein may be implemented as electronic hardware, software, firmware and/or combination(s) thereof. The various illustrative components, blocks, modules, circuits, and steps have been described generally in terms of their functionality. Whether the functionality is implemented as hardware, software, or firmware depends upon the particular application and design constraints imposed on the overall system. Skilled artisans recognize the interchangeability of hardware and software under these circumstances, and how best to implement the described functionality for each particular application. Additionally, with respect to flow diagrams, where possible functional steps may be interchanged in keeping with the spirit and scope of the present invention.

The various illustrative logical blocks, modules, circuits, and algorithm steps described in connection with the embodiments disclosed herein may be implemented or performed with a Digital Signal Processor (DSP), an Application Specific Integrated Circuit (ASIC), a Field Programmable Gate Array (FPGA) or other programmable logic device, discrete gate or transistor logic, discrete hardware components. A processor executing a set of firmware instructions, any conventional programmable software module and a processor, or any combination thereof designed to perform the functions described herein can be designed to implement the functionality described herein. The processor may advantageously be a microprocessor, but in the alternative, the processor may be any conventional processor, controller, micro controller, programmable logic device, array of logic elements, or state machine. The software module could reside in Random Access Memory; RAM; memory, flash memory, Read Only Memory; ROM; memory, Electrically Programmable ROM; EPROM; memory, Electrically Erasable Programmable ROM; EEPROM; memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

It would be apparent to one of ordinary skill in the art, however, that numerous alterations may be made to the embodiments herein disclosed without departing from the spirit or scope of the invention. The previous description of the preferred embodiments is provided to enable a person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system having a rake receiver with multiple fingers, a method comprising:
   determining a lock state for a first finger of the multiple fingers;
   determining a comparison of received signal energy for the first finger to a threshold value if the first finger is out of lock; and
   adjusting a lock filter for processing signals received on the first finger in response to the comparison.

2. The method as in claim 1, further comprising:
   waiting a first time period if the first finger is out of lock before adjusting the lock filter.

3. The method of claim 1, wherein adjusting the lock filter further comprises:
   providing an output of the lock filter equal to the received signal when the energy of the received signal is greater than the threshold; and
   increasing an energy level of the lock filter when the energy of the received signal is less than the threshold.

4. The method of claim 1, further comprising:
   determining a comparison of filtered signal energy for the first finger to a second threshold after adjusting the lock filter; and
   reassigning a path to the first finger in response to the comparison.

5. The method of claim 4, further comprising:
   maintaining path assignments to the multiple fingers for a predetermined time period.

6. The method of claim 1, further comprising:
   determining if a transmitter of the received signal is in soft handoff; and
   providing power control instructions as a function of the energy of the received signal if the transmitter is in soft handoff.

7. The wireless apparatus performing the method of claim 5, further comprising:
   instructing the transmitter to gradually adjust transmit power.

8. A transceiver, comprising:
   a rake receiver having a plurality of fingers, the plurality of fingers adapted to receive multipath signals; and
   a lock detector coupled to the rake receiver operative to adjust signal filtering based on a comparison of a received signal energy for a first finger to a threshold value if said first finger is out of lock.

9. The transceiver of claim 8, wherein the lock detector is further operative to compare the received energy of the received signal to a first energy threshold.

10. The transceiver of claim 8, wherein the lock detector comprises:
   a lock filter operative to filter the received signal; and
   a filter adjustment means operative to adjust the lock filter in response to the lock detector.

11. The transceiver of claim 10, wherein the filter adjustment means waits a predetermined time period prior to adjusting the lock filter.

12. A method for tracking a mobile station in a wireless communication system, comprising:
   determining if the mobile station is in soft hand-off;
   ignoring a lock state of a rake antenna if the mobile station is in soft hand-off; and
   transmitting a predetermined power control pattern if the mobile station is not in soft hand-off.

13. The method of claim 12, further comprising:
   adjusting the power control as a function of received signal energy if the mobile station is in soft hand-off.

14. A wireless apparatus, comprising:
   a filter to filter a received signal from a first propagation path;
   a comparator having a plurality of inputs, and at least one output operative to compare the received signal to a threshold value if a first finger is out of lock; and
   filter adjustment means operative to adjust the filter means in response to the comparison means.

15. The wireless apparatus according to claim 14, wherein said filter adjustment means comprises:
   a threshold generator having at least one output operably connected to a first of said plurality of inputs of said comparator; and
   an AND gate having a plurality of inputs and at least one output, wherein a first of said plurality of inputs is operably connected to said at least one output of said comparator and said at least one output is operably connected to a first of said at least one input of said filter.

16. The wireless apparatus according to claim 14, wherein said filter is an impulse response filter.

17. The wireless apparatus according to claim 14, wherein said filter adjustment means comprise:
   a communication bus;
   a threshold calculation unit; and
   a first threshold generator operably connected to one of said inputs of said comparator and operably connected to said threshold calculation unit via said communication bus, wherein said first threshold generator is adapted to dynamically change.

18. The wireless apparatus according to claim 15, wherein said filter adjustment means further comprises:
   a timer having at least one output, wherein said output is operably connected to a second of said plurality of inputs of said AND gate.

19. A lock detector, comprising:
   a lock filter having at least one input and at least one output;
   a first comparator having a plurality of inputs, and at least one output, wherein a first of said plurality of inputs is operably connected to said at least one output of said lock filter;
   a first threshold generator having at least one output operably connected to a second of said plurality of inputs of said first comparator;
   a second comparator having a plurality of inputs, and at least one output;
   a second threshold generator having at least one output operably connected to a first of said plurality of inputs of said second comparator; and
   an AND gate having a plurality of inputs and at least one output, wherein a first of said plurality of inputs is operably connected to said at least one output of said second comparator and said at least one output is operably connected to a first of said at least one input of said lock filter.

20. The lock detector according to claim 19, wherein said lock detector further comprises:
   a timer having at least one output, wherein said output is operably connected to a second of said plurality of inputs of said AND gate.

21. The lock detector according to claim 19, wherein said lock filter is an infinite impulse response filter.

22. The lock detector according to claim 19, wherein said first threshold generator is operably connected to a threshold calculation unit by a communication bus, whereby said first threshold generator is adapted to dynamically change.

23. A rake receiving means with multiple fingers, comprising:
   means for determining a lock state for a first finger of the multiple fingers;
   means for determining a comparison of received signal energy for the first finger to a threshold value if the first finger is out of lock; and
   means for adjusting a lock filter for processing signals received on the first finger in response to the comparison.

24. The rake receiving means as in claim 23, further comprising:
   means for waiting a first time period if the first finger is out of lock before adjusting the lock filter.

25. The rake receiving means of claim 23, wherein adjusting the lock filter further comprises:
   means for providing an output of the lock filter equal to the received signal when the energy of the received signal is greater than the threshold; and
   means for increasing an energy level of the lock filter when the energy of the received signal is less than the threshold.

26. The rake receiving means of claim 23, further comprising:
   means for determining a comparison of filtered signal energy for the first finger to a second threshold after adjusting the lock filter; and
   means for reassigning a path to the first finger in response to the comparison.

27. The rake receiving means of claim 26, further comprising:
   means for maintaining path assignments to the multiple fingers for a predetermined time period.

28. The rake receiving means of claim 23, further comprising:
   means for determining if a transmitter of the received signal is in soft handoff; and
   means for providing power control instructions as a function of the energy of the received signal if the transmitter is in soft handoff.

29. The rake receiving means of claim 27, further comprising:
   means for instructing the transmitter to gradually adjust transmit power.

* * * * *